United States Patent [19]
Ward et al.

[11] Patent Number: 5,522,003
[45] Date of Patent: May 28, 1996

[54] GLASS PREFORM WITH DEEP RADIAL GRADIENT LAYER AND METHOD OF MANUFACTURING SAME

[76] Inventors: Robert M. Ward, 905 W. Middlefield, Unit 917, Mountain View, Calif. 94043; David N. Pulsifer, 128 W. 37th Ave., San Mateo, Calif. 94403

[21] Appl. No.: 25,079

[22] Filed: Mar. 2, 1993

[51] Int. Cl.$^6$ .................................................. G02B 6/02
[52] U.S. Cl. .............................. 385/123; 65/410; 65/430; 65/444; 437/163; 264/1.24
[58] Field of Search ..................... 385/123–125; 65/3.11, 3.12, 3.2, 34.2; 437/163, 237, 264, 231; 264/1.5, 1.2

[56] References Cited

U.S. PATENT DOCUMENTS

| | | | |
|---|---|---|---|
| 2,596,799 | 5/1952 | Tillyer et al. | 88/57 |
| 2,717,475 | 9/1955 | McCarthy | 49/81 |
| 2,859,562 | 11/1958 | Dorgelo et al. | 49/92.5 |
| 2,885,826 | 5/1959 | Grieve et al. | 49/81 |
| 2,988,853 | 6/1961 | Certa | 49/81 |
| 3,074,115 | 1/1963 | Albrecht et al. | 18/55 |
| 3,107,757 | 10/1963 | Breadner | 189/36.5 |
| 3,141,753 | 7/1964 | Certa | 65/43 |
| 3,167,418 | 1/1965 | Hopkins et al. | 65/43 |
| 3,202,753 | 8/1965 | Gingras | 174/50.58 |
| 3,203,715 | 8/1965 | Benbenek | 285/238 |
| 3,275,358 | 9/1966 | Shonebarger | 287/189.365 |
| 3,311,462 | 3/1967 | Maiden | 65/41 |
| 3,370,874 | 2/1968 | Scherer et al. | 287/189.365 |
| 3,374,074 | 3/1968 | Russell et al. | 65/2 |
| 3,467,510 | 9/1969 | Knochel et al. | 65/59 |
| 3,600,017 | 8/1971 | Scherer | 287/189.365 |
| 3,614,197 | 10/1971 | Nishizawa et al. | 350/96 |

(List continued on next page.)

FOREIGN PATENT DOCUMENTS

| | | | |
|---|---|---|---|
| 0129306 | 12/1984 | European Pat. Off. | C03B 37/025 |
| 0311308 | 4/1989 | European Pat. Off. | C03C 27/02 |
| 0357341 | 3/1990 | European Pat. Off. | C03B 37/018 |
| 3739189A1 | 6/1989 | Germany | C03B 37/012 |
| 52-156641 | 12/1977 | Japan | G02B 5/14 |
| 59-92937 | 5/1984 | Japan | C03B 37/00 |
| 59-217632 | 12/1984 | Japan | C03B 37/00 |
| 1492779 | 11/1977 | United Kingdom | H05B 5/08 |
| 2148875 | 6/1985 | United Kingdom | G02B 6/00 |
| 2193956 | 2/1988 | United Kingdom | C03B 37/025 |
| WO88/10241 | 12/1988 | WIPO | C03B 37/027 |

OTHER PUBLICATIONS

New Light–Focusing Fibers Made by a Continuous Process, K. Koizumi, IEEE, pp. 72–77, Feb. 1974.
Optical Fiber System, C. Kao, McGraw–Hill, (1982), pp. 67–70 (No Month).
Glass Fibers for Optical Communications, Maurer, Apr. 1973, pp. 60–61.
Current Developments in Optical Engineering and Diffraction Phenomena, D. Moore, SPIE vol. 679, (1986), No Month p. 3.
An Introduction to Fiber Optics System Design, Briley, (1990), pp. 31–32 (No Month).
Optical Fibers, Takarori Okoshi, Academic Press (1982), p. 33 (No Month).
Fiber Optics, R. Seippel, Reston Publishing (1984), (No Month).

*Primary Examiner*—Akm E. Ullah
*Attorney, Agent, or Firm*—Fliesler, Dubb, Meyer & Lovejoy

[57] ABSTRACT

A glass preform structure, preferably of an optical glass, constructed with a central core of a first material, a surrounding tube of a second material, and a deeply placed bonded layer integrally formed between the core and tube preferably by a heat driven interdiffusion of the first and second materials. The deeply placed interface layer of the resulting preform structure exhibits material characteristics related to the interdiffused material characteristics of the rod and tube materials. The interdiffusion is preferably performed while supporting the combined rod and tube structure. The preform is rotated during heating to maintain the geometric symmetry of the preform and of the interface layer. An encapsulating carrier is used to support the preform in all dimensions during heating.

13 Claims, 3 Drawing Sheets

U.S. PATENT DOCUMENTS

| | | | |
|---|---|---|---|
| 3,615,325 | 10/1971 | Falling | 65/43 |
| 3,631,589 | 1/1972 | Garceau | 29/588 |
| 3,697,823 | 10/1972 | Correll | 317/230 |
| 3,858,378 | 1/1975 | Allen et al. | 52/759 |
| 3,870,399 | 3/1975 | Randall et al. | 350/96 B |
| 3,899,315 | 8/1975 | Siegmund | 65/23 |
| 3,980,459 | 9/1976 | Li | 65/18 |
| 3,982,916 | 9/1976 | Miller | 65/3 A |
| 4,017,959 | 4/1977 | Fletcher et al. | 29/447 |
| 4,073,379 | 2/1978 | Deeg et al. | 351/169 |
| 4,079,111 | 3/1978 | Uhiig | 264/89 |
| 4,128,697 | 12/1978 | Simpson | 428/433 |
| 4,148,621 | 4/1979 | Gilemeroth | 65/3 A |
| 4,154,591 | 5/1979 | French et al. | 65/2 |
| 4,194,807 | 3/1980 | Gliemeroth | 350/96.31 |
| 4,217,027 | 8/1980 | MacChesney et al. | 350/96.3 |
| 4,227,806 | 10/1980 | Watkins | 356/73.1 |
| 4,243,298 | 1/1981 | Kao et al. | 350/96.33 |
| 4,248,614 | 2/1981 | Scherer | 65/3 A |
| 4,253,863 | 3/1981 | Iyengar | 65/181 |
| 4,257,797 | 3/1981 | Andrejco et al. | 65/3 A |
| 4,273,282 | 6/1981 | Norvell et al. | 228/116 |
| 4,277,272 | 7/1981 | Schneider | 65/3 A |
| 4,277,716 | 7/1981 | Banks, Jr. | 313/220 |
| 4,277,761 | 7/1981 | Silva et al. | 331/94.5 T |
| 4,278,459 | 7/1981 | Partus | 65/18 |
| 4,314,833 | 2/1982 | Küppers | 65/3.12 |
| 4,331,462 | 5/1982 | Fleming, Jr. et al. | 65/3.12 |
| 4,334,903 | 6/1982 | MacChesney et al. | 65/3.12 |
| 4,346,294 | 8/1982 | Albaugh et al. | 250/227 |
| 4,377,404 | 3/1983 | Hoshikawa et al. | 65/59.22 |
| 4,383,736 | 5/1983 | Forman | 350/320 |
| 4,389,089 | 6/1983 | Strack | 350/96.26 |
| 4,417,733 | 11/1983 | Usher | 277/1 |
| 4,445,918 | 5/1984 | Modone et al. | 65/3.12 |
| 4,447,124 | 5/1984 | Cohen | 350/96.30 |
| 4,477,273 | 10/1984 | Lynch et al. | 65/3.12 |
| 4,486,214 | 12/1984 | Lynch et al. | 65/3.12 |
| 4,501,601 | 2/1985 | Haupt | 65/2 |
| 4,504,299 | 3/1985 | MacChesney et al. | 65/3.12 |
| 4,509,880 | 4/1985 | Wamstad | 403/179 |
| 4,516,782 | 5/1985 | Usher | 277/1 |
| 4,521,351 | 6/1985 | Ohtsuka et al. | 264/1.5 |
| 4,548,466 | 10/1985 | Evans et al. | 350/96.20 |
| 4,556,613 | 12/1985 | Taylor et al. | 429/101 |
| 4,557,561 | 12/1985 | Schneider et al. | 385/124 |
| 4,587,144 | 5/1986 | Kellerman et al. | 428/36 |
| 4,593,974 | 6/1986 | Yamomoto et al. | 350/96.34 |
| 4,594,763 | 6/1986 | Frazee, Jr. et al. | 29/407 |
| 4,595,557 | 6/1986 | Bowsky | 419/49 |
| 4,607,189 | 8/1986 | Born | 313/477 R |
| 4,612,029 | 9/1986 | Kramer et al. | 65/59.24 |
| 4,617,044 | 10/1986 | Kramer et al. | 65/49 |
| 4,636,236 | 1/1987 | Glessner et al. | 65/3.12 |
| 4,643,751 | 2/1987 | Abe | 65/3.12 |
| 4,649,085 | 3/1987 | Landram | 428/620 |
| 4,675,038 | 6/1987 | Ainslie et al. | 65/3.12 |
| 4,676,817 | 6/1987 | Tailor et al. | 65/43 |
| 4,678,358 | 7/1987 | Layher | 403/28 |
| 4,704,151 | 11/1987 | Keck | 65/4.1 |
| 4,716,082 | 12/1987 | Ahearn et al. | 428/428 |
| 4,722,825 | 2/1988 | Goldstein | 419/8 |
| 4,726,507 | 2/1988 | Landram | 228/124 |
| 4,734,117 | 3/1988 | Pilon et al. | 65/3.12 |
| 4,740,225 | 4/1988 | Cocito et al. | 65/3.12 |
| 4,746,345 | 5/1988 | Pluijms et al. | 65/2 |
| 4,772,302 | 9/1988 | Abe | 65/3.12 |
| 4,773,924 | 9/1988 | Berkey | 65/3.11 |
| 4,788,382 | 11/1988 | Ahearn et al. | 174/52 FP |
| 4,799,949 | 1/1989 | Keck et al. | 65/3.12 |
| 4,802,733 | 2/1989 | Bachmann et al. | 350/96.34 |
| 4,816,216 | 3/1989 | Chao et al. | 420/94 |
| 4,820,322 | 4/1989 | Baumgart et al. | 65/3.11 |
| 4,842,626 | 6/1989 | Barns et al. | 65/2 |
| 4,869,743 | 9/1989 | Fitoussi et al. | 65/3.11 |
| 4,888,037 | 12/1989 | Bandyopadhyay et al. | 65/32.2 |
| 4,902,323 | 2/1990 | Miller et al. | 65/3.11 |
| 4,902,324 | 2/1990 | Miller et al. | 65/3.11 |
| 4,905,074 | 2/1990 | Chao et al. | 357/67 |
| 4,909,816 | 3/1990 | MacChesney et al. | 65/3.12 |
| 4,915,467 | 4/1990 | Berkey | 350/96.15 |
| 4,915,719 | 4/1990 | Saffari | 65/32.2 |
| 4,921,516 | 5/1990 | Roba | 65/3.12 |
| 4,925,473 | 5/1990 | Jeskey et al. | 65/12 |
| 4,928,368 | 5/1990 | Greenspan et al. | 29/1.22 |
| 4,931,076 | 6/1990 | Berkey | 65/4.2 |
| 4,932,990 | 6/1990 | Michie et al. | 65/3.12 |
| 4,938,788 | 7/1990 | Segawa et al. | 65/18.1 |
| 4,940,855 | 7/1990 | Waitl et al. | 174/52.5 |
| 4,948,217 | 8/1990 | Keck et al. | 350/96.15 |
| 4,960,550 | 10/1990 | Wright | 264/56 |
| 4,971,614 | 11/1990 | D'Annessa et al. | 65/3.12 |
| 4,978,377 | 12/1990 | Brehm et al. | 65/3.11 |
| 4,979,972 | 12/1990 | Berkey et al. | 65/4.2 |
| 4,983,195 | 1/1991 | Nolan et al. | 65/4.2 |
| 5,009,692 | 4/1991 | Miller et al. | 65/3.11 |
| 5,017,206 | 5/1991 | Miller et al. | 65/3.11 |
| 5,031,300 | 7/1991 | Berkey et al. | 29/458 |
| 5,045,508 | 9/1991 | Brow et al. | 501/48 |
| 5,048,923 | 9/1991 | Tsumanuma et al. | 385/124 X |
| 5,067,789 | 11/1991 | Hall et al. | 385/27 |
| 5,235,323 | 10/1993 | Koike et al. | 385/143 |
| 5,235,660 | 8/1993 | Perry et al. | 385/124 |
| 5,268,339 | 12/1993 | Aghajanian et al. | 501/127 |
| 5,504,297 | 3/1985 | Kosinski et al. | 65/3.11 |

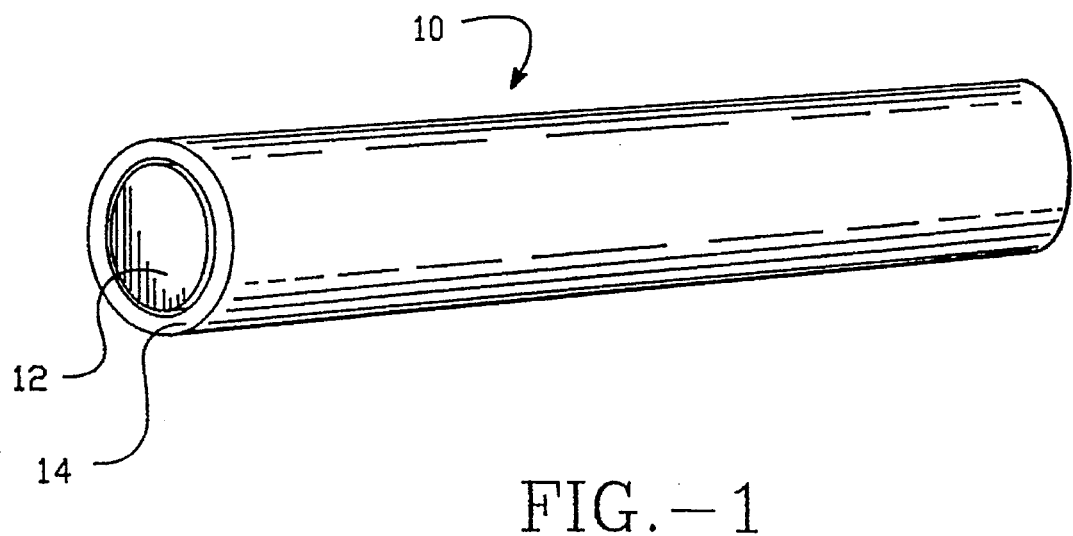
FIG.—1
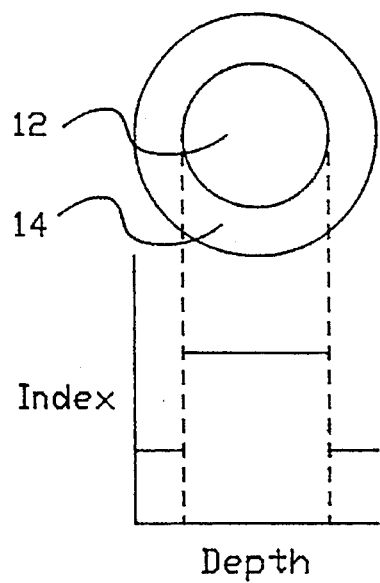
FIG.—2a
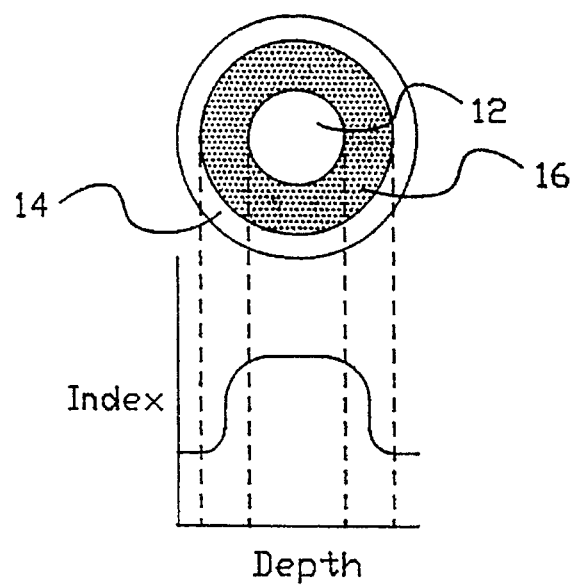
FIG.—2b

GLASS PREFORM WITH DEEP RADIAL GRADIENT LAYER AND METHOD OF MANUFACTURING SAME

BACKGROUND OF THE INVENTION

1. Field of the Invention

The present invention is generally related to imaging and non-imaging optical preforms utilized, for example, in the fabrication of optical fibers, emitters, and sensors and, in particular, to the formation of a unique optical preform having a deeply placed radially bonded interface layer of controlled radial depth and symmetry.

2. Description of the Related Art

There are numerous applications and methods of producing optical preforms. Some of the more common preform applications include use as the source component for the drawing of optical fiber, as bulk source material for lens blanks, and as the cap or encapsulating lens of optical emitters. In these and other uses, the optical, mechanical and thermal properties of the optical preform and the precise definition of these properties is greatly valued. Furthermore, a graded variation of these properties within the finished product, either through structural or material processing, is also greatly desired.

At least three primary methods of fabricating optical preforms relevant to the present invention are conventionally known. The first is the use of chemical vapor deposition (CVD) to deposit a material on the interior surface of a glass tube. The object of this process is to provide a core portion of a material having a first set of optical characteristics surrounded by a cladding layer having a second set of optical characteristics. Creation of the optical preform requires the use of a cladding tube formed from a high purity silica based glass, typically composed of greater than 95% silica, with a small amount of a low diffusivity dopant added to establish the optical characteristics of the cladding. The low diffusivity of the dopant is required to minimize thermal migration if not direct loss of the dopant during processing. A high purity silica vapor, though also containing a low concentration of a selected dopant, is then pumped through the cladding tube while the cladding is heated in a zone that is mechanically moved repeatedly along the length of the cladding to facilitate the actual deposition of silica and dopant from the vapor phase onto the interior surface of the cladding. Selection of the vapor phase dopant material and its concentration, and thereby the optical characteristics of the core material formed by deposition, is particularly limited by the requirement of uniform deposition of the dopant relative to the deposited silica. In addition, temperatures and flow rates must be further carefully maintained to achieve the uniform deposition of the silica while retaining a uniform dopant concentration in the original and deposited material. Precise temperature control is also required so as not to overheat the cladding, resulting in asymmetrical deformation that would, in turn, compromise the desired geometric structure of the optical preform. Once a layer of the core silica material has been deposited, a high temperature treatment must be uniformly applied to the cladding and core to collapse the entire structure as necessary to fill the center of the preform.

The CVD process is not only costly and complex due to the required precision at many process steps, but the process is quite time intensive since the rate of uniform vapor phase deposition is inherently low. Perhaps the most significant limitation, however, is that substantial materials limitations are present due to the fundamental nature of the process. In particular, the cladding and vapor deposited core materials are required to be of the same elemental glass composition, conventionally referred to as being of the same glass "family." Examples of conventional glass families include borosilicate glasses, lead glasses, and barium glasses. By virtue of the core and cladding being of the same glass family and the ratio of dopants to silica in both being quite low, the difference in material properties between the core and cladding is inherently limited. For example, CVD preforms are substantially limited to a core to cladding difference in index of refraction of about 0.1 and more typically 0.03 or less.

Also, the thermal and mechanical properties of the vapor deposited core and cladding materials are highly interdependent in order to perform correctly in the final collapse stage of the process so that undue strain is not placed on the cladding material. Consequently, the optical, mechanical and thermal properties of the preform fabricated in a CVD process are significantly limited.

Another process for forming optical preforms uses ion diffusion to alter the surface optical, mechanical and thermal properties of an otherwise homogeneous optical material rod. In this process, the rod is placed in an ion salt bath and heated to a temperature sufficient to encourage ion transport at the surface of the rod material. In effect, a leaching of the surface material occurs resulting in an alteration of the material properties within the leached zone. This zone can be formed to a substantial radial depth, though only at the surface of the rod material. As a practical matter, however, the zone can achieve a radial depth of only a fraction of a millimeter to several millimeters during a leaching period of about three to four months. Furthermore, due to ion transport mechanics being highly dependent on the specific ion concentration at the surface of the optical rod material, precise control of the resulting optical characteristics is quite difficult. The leaching action also directly reduces the material strength and integrity of the preform in the affected zone. Consequently, the finished optical properties of the resulting preform may vary to a degree that is not commercially acceptable for many optical preform uses.

Finally, a third method for forming an optical preform is to simply collapse a cladding tube of an optical material onto a rod of the same or different optical material. U.S. Pat. No. 4,486,214, issued to Lynch on Dec. 4, 1984, discloses an example of this process. The object of the preform fabrication process disclosed there is to create a preform having a sharply defined change in index of refraction between the inner rod and outer tube material. Although not as limited as in CVD processes, the choice of materials for the outer tube is limited by the requirement that the outer tube collapse uniformly onto the rod without deformation of the rod material. The thermal and mechanical characteristics of the collapsing tube must therefore be chosen to allow a uniform collapse at a temperature appropriately below the melting temperature of the rod material. The collapsed tube is ultimately fused to the rod material not as part of the formation of the preform, but only during a separate subsequent step of drawing the optical preform into optical fiber. The simultaneous step of fusing and drawing the fiber allows the abrupt optical interface between the tube and rod material to be sharply maintained, the precise goal of preforms made by this process. However, materials fusion at the drawing stage also maintains any impurities and gaps that may exist at the material interface. Consequently, a premium is placed upon the initial precise collapse of the tube on the rod in performance of this process.

SUMMARY OF THE INVENTION

A general purpose of the present invention is therefore to provide an optical preform that, in the preform form, achieves a deeply placed bonded interface layer that represents an interface layer of controlled thickness with a physical or optical gradient related to the properties of a center core material and an outer cladding material.

This is achieved by a preform structure constructed with a central rod of a first material, a surrounding tube of a second material, and a shallow or deep interface layer integrally formed between the rod and tube, preferably by a heat driven interdiffusion of the first and second materials. The interface layer of the resulting preform structure exhibits material characteristics related to the interdiffused material characteristics of the rod and tube materials.

A process of creation of the preform structure includes the steps of (1) collapsing a tube onto a rod, (2) supporting the combined structure, and (3) heating the preform structure to form the deeply placed bonded layer at the interface between the tube and the rod. The preform is preferably rotated about its cylindrical axis during heating. An encapsulating carrier is preferably used to support the preform during heating and rotation in the formation of deep interface layers.

Thus, an advantage of the present invention is that it is capable of achieving a continuous or smooth stepped radially graded property region in an optical preform structure. The gradient profile of the region is directly related to and significantly controlled by the radial depth of the region.

Another advantage of the present invention is that it efficiently provides a highly controllable deeply placed bonded radial interface layer within an optical preform providing for a smooth transition of one or more properties between two material layers. The controlled properties may include but are not limited to index of refraction, thermal expansion coefficient, density, material composition, tensile and compressive strength, and thermal transfer properties.

A further advantage of the present invention is that the deeply placed radial bonded interface layer may achieve a radial thickness or depth of up to the full radial dimension of the optical preform. Furthermore, the interface layer may effectively consume either the rod or tube layer, depending substantially on the relative radial dimensions of the rod and tube.

Yet another advantage of the present invention is that the process for manufacturing the inventive optical preform structure is not limited to any particular family of materials, such as lead silica, borosilica, barium silica or the like.

Still another advantage of the present invention is that any number of concentric deeply placed interface layers, each having a different radius, can be constructed in accordance with the present invention.

Yet still another advantage of the present invention is that the process for manufacturing the inventive optical preform maintains the structural and optical symmetry of the preform.

A still further advantage of the present invention is the use of a thermal gravitational control step for affecting the thermal migration of dopant atoms in the deeply placed radial bonded interface layer and, thereby, the gradient of material properties radially through the deeply placed radial bonded interface layer.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein:

FIG. 1 is a illustrative perspective view of a tube shown prepared for being collapsed about a center rod;

FIG. 2a is a representative end view of a collapsed rod and tube structure and a graph showing the variation of a material property, such as index of refraction, having an abrupt variance with respect to depth;

FIG. 2b shows an end view of a collapsed rod and tube structure with an intervening deeply placed radial bonded interface layer in accordance with a preferred embodiment of the present invention and a graph relating a material property, such as index of refraction, having a smooth stepped radial gradient across the deeply placed radial bonded interface layer as a function of radial depth;

DETAILED DESCRIPTION OF THE INVENTION

Figure 2C:
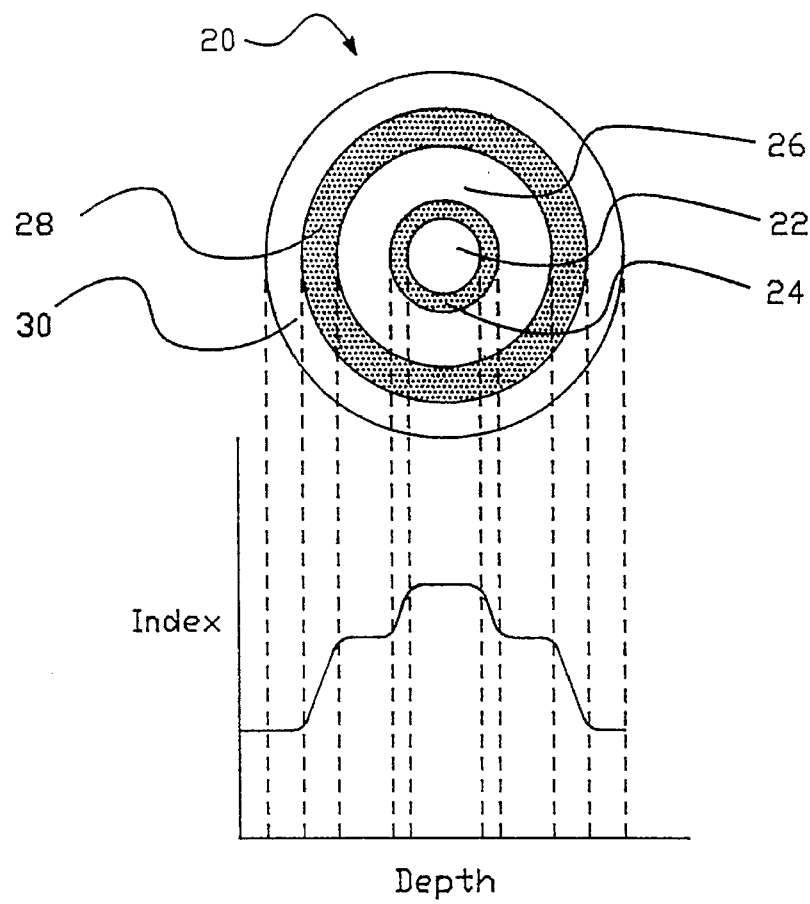
FIG. 2c shows an end view of a multiple collapsed tube and rod preform structure in accordance with a preferred embodiment of the present invention with two deeply placed radial bonded interface layers interposed between successive tube layers, and a graph showing a smooth stepped radial gradient of a material property, such as index of refraction, varying with radial depth.

The initial stage in fabricating an optical preform consistent with the present invention is shown in FIG. 1. While the process for completing the fabrication of the optical preform will be described in detail, it should be readily apparent to those skilled in the art that many changes and modifications, particularly in terms of dimensions and choice of materials, can be made without departing from the invention in its broader aspects. Accordingly, the specific embodiments disclosed are only representative in providing a basis for the claims which define the scope of the present invention.

In FIG. 1, an optical preform 10 is shown in the preferred process of construction from an initial cylindrical rod 12 inserted through a matching cylindrical hollow in a tube 14. The material of the rod 12 and tube 14 may be chosen from any of a number of families of optical materials, typically referred to as glassy materials, including lead silica, borosilica, and other glass families that are well known in the art. Typically, each family of glasses is characterized as a glass having the same constituent components, though delimited by the general requirement of maintaining an adequate crystalinity, clarity and elasticity for the glass.

In accordance with the present invention, the rod 12 and tube 14 need not be formed from similar materials or even of materials from the same glass families. Rather, the process of manufacturing the optical preform 10 is compatible with rod and tube materials that are quite dissimilar in optical, mechanical and thermal characteristics as defined by choice of differing material compositions of the glasses. However, selection of the materials for the rod 12 and tube 14 are not without limitation. In accordance with the present invention, the materials must be selected so as to have generally similar melting temperatures such that during subsequent processing, the predominant mechanism for the mixing of materials between the rod 12 and tube 14 is interdiffusion rather than convection mixing. Generally, a melting temperature difference of within about 100 degrees Celsius and preferably within about 50 degrees Celsius is adequate for purposes of the present invention. Also, the choice of glass components of the rod 12 and tube 14, when interdiffused, must produce a glass having an adequate crystalinity, clarity and elasticity.

Another limitation is that the coefficients of expansion between the rod 12 and tube 14 must be relatively closely matched to permit processing of the optical preform 10 to temperatures at or above the softening points of the rod and tube glassy materials and with controlled slow cooling back to room temperature. Naturally, the mechanical properties of both the rod 12 and tube 14 materials must be considered in determining whether the coefficient of expansion are adequately matched for the particular materials. Specifically, where the coefficient of expansion is greater for the rod material than for the tube, the brittleness of the tube 14 will likely serve as the limiting factor in determining whether the coefficients of expansion are sufficiently matched to preclude cracking of the tube 14 during cooling.

The separate choice of materials must also permit a rather finely polished surface to be created on the exterior cylindrical surface of the rod 12 and interior bore surface of the tube 14. In order to create a uniform structure, voids of all kind must be avoided at the interface between the rod 12 and tube 14. In order to insert the rod into the bore of the tube 14, the radius of the rod 12 must be slightly less than that of the bore. As the optical preform structure 10 is heated, any gas present must not be impeded in flowing out of the annular gap between the rod 12 and tube 14. Even where all gas is evacuated prior to heating, the creation of voids may occur in the presence of rough mating surfaces. Thus, even in evacuated manufacture of the preform 10, polished mating surfaces are required. The degree of polishing, however, depends greatly upon the materials utilized, but can be readily determined to be sufficient where microscopic examination of the optical preform reveals the absence of voids above a diameter acceptable for the intended use of the optical preform. In general, an adequate degree of polishing is not difficult to obtain.

Finally, the dimensions of the annular spacing between the rod 12 and tube 14 must be sized to account for any greater coefficient of thermal expansion by the rod 12 relative to the tube 14, particularly where the melting point of the rod material is lower than that of the tube material. Ideally, the annular space is sized to permit the rod material to reach its melting point with a radial expansion sufficient to close the annular space between the rod 12 and the tube 14 without placing an expansive force on the interior surface of the tube 14 in excess of the expansive strength of the tube 14.

Referring now to FIG. 2a, an end view of the preform 10 following collapse of the tube 14 onto the rod 12 is shown. While index of refraction is illustrated, all of the material properties of the preform 10 are essentially uniform within the rod 12 and tube 14, respectively. By the creation of a deeply placed radial bonded layer at the interface between the rod 12 and tube 14, as shown in FIG. 2b, an interface layer 16 is constructed with material properties that vary through a smooth, continuous step from those of the rod 12 to those of the tube 14. Furthermore, this deeply placed bonded interface layer 16 is intimately fused with and formed from an intermix of both the material of the rod 12 and of the tube 14.

As generally indicated in FIG. 2c, multiple concentric deeply placed bonded interface layers can be created both concurrently as well as successively. A second optical preform 20 is shown with a central rod 22, a first tube 26 cylindrically surrounding the rod 22, and a second tube 30 cylindrically surrounding the first tube 26. For concurrent creation of interface layers 24, 28, the tubes 26, 30 are both collapsed onto the rod 22 before beginning a process of creating of the deeply placed bonded interface layers 24, 28.

For sequential generation of the interface layers 24, 28, the first tube 26 may be collapsed upon the rod 22 and the composite preform structure processed to form a deeply placed bonded interface layer 24 having an initial desired thickness. That is, the composite preform 22, 26 may be heated in accordance with the present invention so as to fuse or bond the mating surfaces of the tube 26 and rod 24, thereby creating at least an initial thickness of the interface layer 24. A second tube 30 may then be collapsed upon the outer surface of the tube 26 and the resulting composite preform structure again heated in accordance with the present invention to complete the formation of the interface layer 24 and to create a second interface layer 28, both to their final intended thicknesses. As generally indicated by the variance in index of refraction between the various layers, the interface layers 24, 28 establish regions of continuous smooth stepped properties between the central rod 22, inner tube 26, and outer tube 30.

Figure 2D:
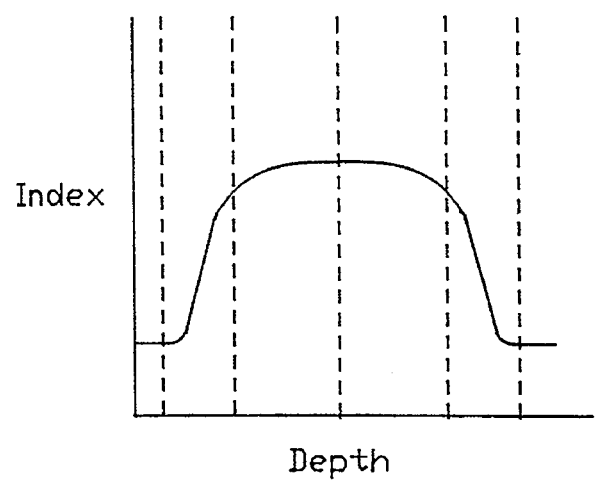
FIG. 2d is a graph showing a smoothly stepped radial gradient of a material property, such as index of refraction, extending across the full depth of the preform structure.

Further in accordance with the present invention, the heating of the composite structures shown in FIG. 2a, 2b and 2c can be performed to an extent where there is an interdiffusion of the rod and tube materials through the full depth of the rod and tubes. Accordingly, as representatively shown in FIG. 2d, interdiffusion of the rod and tube materials into one another can proceed to a point where there is a symmetrical single smooth step radial gradient extending across the full depth of the composite preform 22, 26, 30.

Figure 3A:
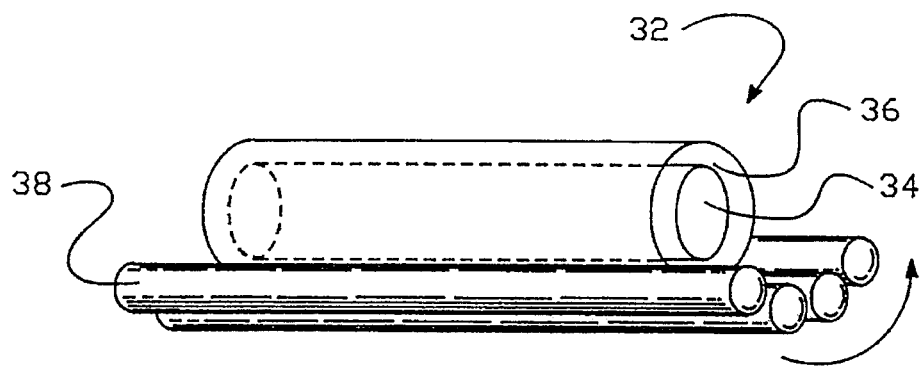
FIG. 3a is an illustrative perspective view of a preferred ceramic roller mechanism for rotating an optical preform structure constructed in accordance with the present invention for purposes of annealing and creation of a deeply placed radial bonded interface layer.

Referring now to FIG. 3a, the initial thermal processing of a composite preform 32 from a simple rod and tube structure will be described. Once a glass rod 34 has been mechanically inserted into the cylindrical bore of a tube 36, the composite structure 32 is placed within a furnace (not shown) that is substantially conventional in nature. The relevant modification to the furnace is the provision for ceramic rollers 38 provided within the interior of the furnace to support and provide for the rotation of the composite preform 32. In the preferred embodiment, with a preform having a diameter of approximately one inch, each of the rollers 38 have an approximate diameter of 20 millimeters.

At this stage of processing, the goal is to heat the composite preform 32 to a temperature close to but generally above the softening temperature of the tube material 36 while allowing the rod material to expand and fuse to the interior bore surface of the tube 36. Rotation of the composite assembly 32 during this thermal processing results in the formation of a uniform bonded interface layer joining the rod 34 to the tube 36. Rotation of the composite assembly 32 also enhances the uniformity of heating across the entire length of the composite assembly 32.

Preferably, the temperature of the composite preform 32 is heated at a conventionally determinable rate, related to the thermal shock resistance of the selected materials, from an initial ambient temperature to a temperature just above the softening temperature of the tube 36; a "near" softening temperature. At about the temperature where the rod will have expanded to contact the inner bore surface of the tube 36, the rotation of the ceramic rollers 38 is initiated to obtain a rotation rate of between about 50 and 150 revolutions per minute of the composite preform 32, though much higher rotation rates may prove to be advantageous and lower rates adequately effective.

Figure 3B:
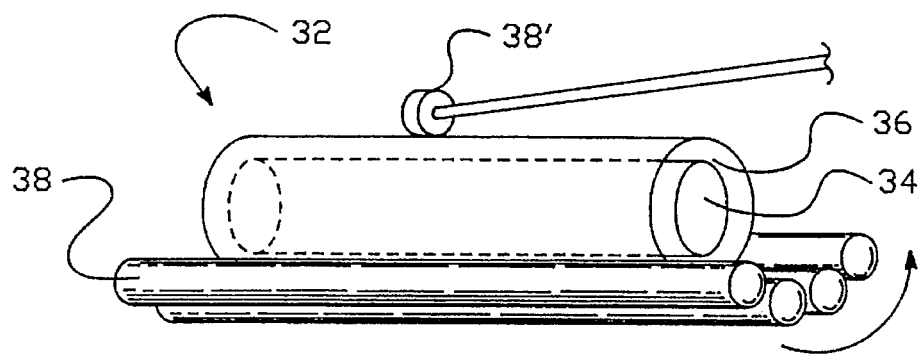
FIG. 3b is an illustrative perspective view of the preferred ceramic roller mechanism with a compressive roller for eliminating the presence of trapped gas and voids at the interface between the collapsed tube and rod.

Once the near softening temperature of the tube 36 has been reached, an additional ceramic roller 38', as generally shown in FIG. 3b, is pressed against the outer surface of the tube 36 in mechanical opposition to the ceramic rollers 38. The pressure roller 38' preferably presents a small contact surface to the exterior surface of the preform 32. In the preferred embodiment, the pressure roller 38' has a diameter of approximately 20 millimeters and an approximate contact width of two millimeters. The rotation of the rollers 38, 38' and the preform 32 is maintained during the pressing, with the contact surface of the pressure roller 38' being translated along the length of the preform 32. The force applied by the roller 38' is selected to be sufficient to substantially drive out any remaining atmospheric gas and voids that may be present at the interface between the rod 34 and tube 36. The ceramic roller 38' is then removed and the composite assembly 32 is maintained rotating at the near softening temperature of the tube 36 for a period of time sufficient to fuse the outer surface of the rod 34 to the inner bore surface of the tube 36.

A controlled cooling of the composite preform 32 is then performed, with the reduction in temperature again being at a conventionally determinable rate. Once the temperature of the rod 34 and tube 36 has decreased to a point intermediate between the near softening temperature of the tube 36 and ambient, characterized as at least where there is no further significant interdiffusion activity between the rod and tube materials, the rotation of the ceramic rollers 38 may be halted.

An annealing of the rod 34, tube 36 and interface between the rod 34 and tube 36 is then preferably allowed to occur at the intermediate temperature level. This annealing step is intended to reduce the material stresses created at the interface between the rod 34 and tube 36, as well as in the rod 34 and tube 36 as a consequence of thermal processing. This annealing step is performed for a period of time that is conventionally determinable based on the materials used, the sizes and geometries of the components, and the bonding temperature and time. After the annealing step is complete, the composite preform 32 may then be slowly cooled to ambient temperature.

The resulting deeply placed bond between the rod 34 and tube 36 represents an intimate fusing of the rod and tube materials across a thickness that is directly related to the relative interdiffusion characteristics of the materials making up the rod 34 and tube 36, the temperature at which the bond formation occurs, the length of time that the fusing is continued, and, to a lesser degree, the rate of rotation of the composite preform 32.

Figure 4:
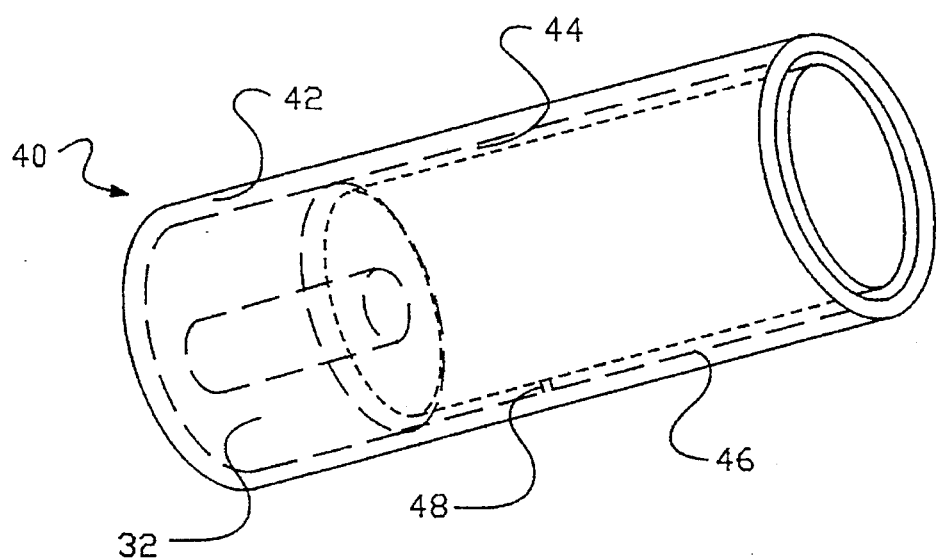
FIG. 4 is an illustrative perspective view of a glass carrier utilized to encapsulate an optical preform structure consistent with a design requirement to permit rotation in creating a deeply placed radial bonded interface layer in accordance with the present invention.

A glass carrier 40 as used in the further processing of the composite preform 32 is shown in FIG. 4. The glass carrier 40 is constructed preferably of an outer high temperature resistant quartz glass tube 42 having one blunt closed end and a second quartz tube 44 of similar material also having one blunt closed end. The composite preform 32, coated with a non-stick agent such as finely powered boron nitride is placed in and adjacent the closed end of the outer tube 42. While other non-stick agents may be used, boron nitride powder is preferred for its high melting temperature even in the presence of an oxidizing atmosphere.

Preferably, the outer diameter of the composite preform 32 and the inner diameter of the tube 42 are chosen to closely match, with allowance for a thin continuous layer of the non-stick agent. The outer diameter of the second tube 44 is also preferably sized to match the inner diameter of the first tube 42. The second tube 44 is inserted into the first tube 42 so as to abut the end of the composite preform 32 with the blunt closed end of the tube 44. The total cylindrical length of the tubes 42, 44 is preferably selected such that the open ends opposite the preform 32 can be heat sealed without conducting sufficient heat to the preform compartment formed in the carrier 40 to heat the composite preform 32 by any appreciable portion of the softening temperature of the preform materials.

The inner and outer tubes 44, 42 need not be sealed along the entirety of their mutual cylindrical interface 46. Rather, a slight annular interface region may be allowed to remain between the outer cylindrical surface of the inner tube 44 and the cylindrical bore surface of the outer tube 42. In order to allow venting of gases from within this annular region during subsequent heat processing of the carrier 40 and preform 32, a pinhole passage 48 is provided between this annular region and the open interior of the second tube 44.

While the forgoing relation between the inner and outer tubes 44,42 is the preferred configuration, the high temperature processing of the preform 32 also requires that there is minimal leakage of liquified glass material from the preform compartment. Where the materials of the preform and non-stick agent have been selected such that there is little outgassing from the preform compartment, the annular region between the inner and outer tubes 44,42 may be sealed and the pin hole 48 omitted.

The function of the glass carrier 40 is to allow processing of the composite preform 32 at temperatures above the softening temperature of both the rod and tube material. This high temperature processing is performed by placing the carrier 40, including the composite preform 32, into the furnace and onto the ceramic rollers 38. The temperature within the furnace is preferably raised at a conventionally determinable rate to a temperature in excess of the softening temperature of both the rod 34 and tube 36. This higher temperature is selected to maximize the rate of interdiffusion of the rod and tube materials by interdiffusion, but without any substantial degree of convective mixing. In order to maximize this allowed temperature, minimize the likelihood of convective mixing due to uneven heating of the preform 32, and to maintain the structural symmetry of the preform 32, the carrier 40 is rotated beginning at a temperature significantly below the softening temperature of either the rod or tube material. The rate of rotation is preferably sufficient to allow the preform 32 to be uniformly heated within the furnace.

The rotation of the carrier 40 may permit the present invention to apply a preferential bias to the relative rate of interdiffusion of the rod material into the tube material. The magnitude of this bias will depend greatly on the densities of the glasses and densities of the dopants present within the glasses. In any event, a modest rate of rotation will insure that the interdiffusion between the rod and tube materials remains symmetrical. Higher rates of rotation may result in the interdiffusion of rod material into the tube material at a greater rate and to a greater depth than the diffusion of tube material into the rod material. Since the optical, thermal and mechanical properties of the resulting composite preform 32 will depend on the relative concentrations of the rod and tube materials particularly in the deeply placed interface layer formed between the rod and tube 34, 36 the rate of rotation may be used to directly impact the properties achieved.

The rotation of the carrier 40 is maintained for a period that will substantially define the thickness of the interface layer formed between the rod 34 and tube 36. Interface layer thicknesses of up to about 0.1 millimeter can be referred to as shallow. Interface layer thicknesses of greater than about 0.1 millimeter can be referred to as deep. The present invention is readily capable of the controlled production of shallow interface layers only several atom diameters thick to deep interface layers tens of millimeters thick limited only by the radius of the composite preform itself.

After formation of the interface layers, a controlled cooling of the carrier 40 is performed down to an annealing temperature below the softening temperatures of both the rod and tube material as well as that of the deep bonded layer. This annealing temperature is, however, preferably selected to be sufficient to anneal the deeply placed interface layer. Rotation of the carrier 40 by the ceramic rollers 38 is preferably halted once this annealing temperature is reached. After a conventionally determinable annealing time, the carrier 40 is cooled slowly to a final ambient temperature.

The carrier 40 then may be cracked open to yield the completed composite preform 32. The resulting preform 32, once cleaned in a conventional manner, can be further processed into an optical fibers or optical lenses having unique properties characterized by a precisely controlled and deeply placed radial gradient.

EXAMPLES

Fabrication of preforms, first to a stage where a fused shallow bond exists and then to a stage where a deep bonded interface layer has been created, is described in the Examples below. Both stages are achieved for two different preform material combinations. The first two examples use glassy materials from the same glass family. The second two examples demonstrate use with glassy materials from two different glass composition families.

Example 1: Deeply Placed Shallow Interface Bond with Custom Lead Glasses

An optical preform was fabricated from two cylindrical pieces of glass. A solid core, or central rod, was approximately 12.78 millimeters in diameter. The cladding tube had an outside diameter of approximately 25.25 millimeters and an inside diameter of approximately 12.90 millimeters. Both components had a length of approximately 28 millimeters. The core and cladding were fabricated from custom lead glasses of substantially matching composition. The principle difference between the two compositions was a slightly different ratio of silica to lead, accounting for a difference in the index of refraction. The core had an index of refraction of 1.67 and a softening temperature of approximately 630 degrees Celsius. The cladding had an index of refraction of 1.59 and a softening temperature of approximately 665 degrees Celsius.

The core was prepared by core drilling the approximate outside diameter from a glass slug of the core material. The final polished diameter was achieved by allowing the core to rotate on a rapidly revolving diamond impregnated pad, first at 350 mesh and then at 1250 mesh.

The cladding sample was prepared from a glass slug of the cladding material by first core drilling the inside diameter and then core drilling the outside diameter to form a cylinder. The inner cylindrical bore surface was then polished to its final diameter by applying a rapidly rotating diamond impregnate pad against the surface, first with a 350 mesh and then with a 1250 mesh.

The annular space between the core and the cladding was chosen, in view of the above material characteristics of the core and cladding, to compensate for the anticipated differential expansion during heating.

The core was inserted in the cladding cylinder and this assembly was placed on the rotation roller mechanism within the furnace. In accordance with the present invention, it is desired to apply both heat and rotation to the mechanically prepared core and cladding assembly in order to realize the initial fusion bonding of the core and cladding materials. A conventional furnace was modified to accept ceramic rollers extending completely through the furnace. The ceramic rollers were externally supported and driven. The core and cladding assembly was positioned freely upon the rollers within the furnace.

The core and cladding assembly was heated to an interface bonding temperature of 670 degrees Celsius over a period of three hours. Rotation was started once the temperature reached 560 degrees Celsius; rotation was then maintained at a rate of approximately 97 revolutions per minute. Once at 670 degrees Celsius, the assembly was slowly pressed from end to end using a ceramic roller, having an approximately 20 millimeter diameter and an approximately 2 millimeter wide contact surface, pressed against the core and cladding assembly for a period of between about 15 and 60 seconds. The rolling axis of the pressure roller was slightly skewed relative to the rolling axis of the preform. The rotation of both the pressure roller and the preform were maintained substantially synchronous throughout the pressing. This pressing was done to ensure that any residual air bubbles were driven to the ends of the assembly. During the pressing the furnace incidentally cooled to 620 degrees Celsius. Once the pressing was completed, the temperature returned to 670 degrees Celsius for the remaining duration of the interface bonding period.

At the conclusion of the interface bonding period, an annealing step was performed. The interface bonded preform, the furnace and rotation mechanism were cooled from the bonding temperature to 440 degrees Celsius at a rate of about 2.0 degrees Celsius per minute. Once reaching 450 degrees Celsius, rotation was halted. The temperature was then held at 440 degrees Celsius for one hour and then cooled to 360 degrees Celsius at about 0.2 degrees Celsius per minute. The furnace was then allowed to slowly cool to room temperature over a period of several hours.

After reaching room temperature, the diameter of the interface bonded preform was measured to be approximately 25.10 millimeters. A small slice was taken off one of the ends for optical measurement. The diameter of the interface bond was measured to be approximately 0.062 millimeters.

This process was successful in creating a deeply placed shallow interface bond of controlled and uniform thickness, formed in intimate fused contact with the core and cladding layers, and consisting of a combination of the core and cladding materials.

A materials stress analysis, performed by placing polarizing filters on each axial end of the preform slice, determined that there was a localized region of stress closely surrounding the core, but no apparent stress in the core itself. This localized stress pattern is generally desirable, since compressive stress about the core adds strength to the preform.

Example 2: Deeply Placed Deep Bonding Interface Layer with Custom Lead Glasses

This Example 2 utilized the shallow interface bonded preform prepared in Example 1. In order to maintain the form and geometry of the preformat the higher temperatures necessary for the formation of the deep interface layer, the preform was supported in all dimensions by a high temperature resistant quartz glass encasement having internal dimensions closely matching the external dimensions of the preform. Prior to insertion into the encasement, the preform was first completely coated with fine powdered boron nitride as a non-stick agent. After insertion, the encasement was sealed off, leaving only a small air hole to allow the escape of gasses. The prepared preform and encasement were then returned to the furnace and placed on the roller assembly.

The preform and encasement were then heated to 840 degrees Celsius over a total period of approximately four hours and 20 minutes. Rotation of the preform and encasement was initiated once the temperature reached 595 degrees Celsius; the rotation was at a rate of approximately 82 revolutions per minute. Once the temperature reached 840 degrees Celsius, the temperature was held constant for approximately four hours. Thereafter, the preform and encasement were cooled to 440 degrees Celsius at 3.81 degrees Celsius per minute. The preform and encasement were held at 440 degrees Celsius for one hour and the rotation stopped. The preform and encasement were then cooled to 320 degrees Celsius at approximately 0.21 degrees Celsius per minute, and then allowed to slowly cool to room temperature. Once at room temperature, the encasement was cracked open and the deep interface layer preform was readily released.

The dimensions of the preform at the end of the deep bonding process measured approximately 24.89 millimeters in diameter. The thickness of the deep bonded layer was measured at approximately 1.31 millimeters. This deep interface layer was found to exist uniformly between the core and cladding layers.

A stress analysis of a center 11.28 millimeter length of the deep bonded layer preform revealed localized compressive stress patterns surrounding the core, again indicating a generally desirable increase in the strength of the preform.

Example 3: Deeply Placed Shallow Interface Bond with Specialty Glasses

The core and cladding were prepared substantially as described in Example 1, though differing as follows. The solid core was approximately 81.20 millimeters long and 12.70 millimeters in diameter. The cladding had length of approximately 80.95 millimeters with an outside diameter of approximately 25.40 millimeters and an inside diameter of approximately 12.98 millimeters.

The core material was a lead borosilicate glass with an index of refraction of 1.56, a density of about 3 grams per cubic centimeter, and a softening temperature of about 600 degrees Celsius. The cladding was an alkali borosilicate glass with an index of refraction of 1.48, a density of 2.4 grams per cubic centimeter, and a softening temperature of approximately 628 degrees Celsius. Both the core and cladding materials are commercially available compositions obtainable from Specialty Glass Corporation, 305 Marlborough Street, Oldsmar, Fla., 34677.

The core and cladding assembly was heated to the bonding temperature of 660 degrees Celsius in a period of three hours. Rotation, at a rate of approximately 96 revolutions per minute, was started when the temperature reached 600 degrees Celsius. Once at 660 degrees Celsius, the assembly was pressed from one end to the other using the approximately 20 millimeter ceramic roller, while both continued to be rotated. During the pressing, the furnace incidentally cooled to 630 degrees Celsius. Following the pressing, the furnace was reheated to 660 degrees Celsius, and held for ten minutes. A second, otherwise identical pressing was then performed.

To anneal the preform, the furnace and rotation mechanism were cooled from the bonding temperature to 460 degrees Celsius at a rate of about 5.7 degrees Celsius per minute. Upon reaching 460 degrees Celsius, rotation was stopped. The temperature was held at 460 degrees Celsius for one hour and then cooled to 383 degrees Celsius at about 0.9 degrees Celsius per minute. The furnace was then allowed to slowly cool to room temperature over a period of several hours.

After reaching room temperature, the preform diameter was measured to be approximately 24.94 millimeters. A small slice was taken off one of the ends for measurement. The thickness of the interface bond layer was measured to have a thickness of approximately 0.035 millimeters.

Again, a deeply placed shallow interface bond of controlled and uniform thickness was achieved. Also, the compressive stress region localized around the core of the preform was again found to exist, indicating that the preform had increased in strength.

Example 4: Deeply Placed Deep Bonding Interface Layer with Specialty Glasses

The shallow interface bond preform prepared in Example 3 was further processed substantially as described in Example 2, though differing as follows.

A center slice of about 25.26 millimeters in length was cut from the shallow interface bonded preform. After placement of the preform in the encasement, the preform and encasement were heated to 760 degrees Celsius over a period of three hours and ten minutes. Rotation, at a rate of about 83 revolutions per minute, was started when the temperature reached 460 degrees Celsius. Once the temperature reached 760 degrees Celsius, the temperature was held for two hours. The encasement and preform were then cooled to 460 degrees Celsius at approximately 3.5 degrees Celsius per minute, then held at 460 degrees Celsius for one hour. Rotation was then stopped and the encasement and preform were cooled to 350 degrees Celsius at approximately 0.2 degrees Celsius per minute. The encasement and preform were then allowed to slowly cool to room temperature.

The diameter of the deep interface layer preform, at the end of the process, was approximately 25.12 millimeters. The thickness of the deep bonded layer was measured to have a thickness of 0.45 millimeters; at least a full order of magnitude greater than the thickness of the starting shallow interface layer. Also, the compressive stress region localized around the core of the preform was again found to exist, indicating an increase in strength.

From the forgoing Examples it can be seen that the present invention may readily utilize materials of quite different optical, mechanical and thermal properties, subject to the limitations described above. Specifically, by choice of materials from different glass families, such as a lead glass for a core rod and a barium or rare earth glass for the tube, an index of refraction difference as high as 0.3 or higher can be achieved with the present invention.

Thus, unique preform structures, characterized by highly controlled deeply placed shallow and deep interface layers, and a method of producing the same has been described. The foregoing description of the structures and method, as well as the identification of the applicable materials and properties is intended to be illustrative rather than exhaustive. Accordingly, as will be readily appreciated by a practitioner of skill in the relevant arts, other materials and properties are within the scope of the appended claims.

We claim:

1. A glass fiber preform, suitable for use in the production of lens and fibers, comprising:
   a) a core of a first glass material, said core having a central axis;
   b) a tube of a second glass material surrounding said core along a length of said central axis;
   c) a deeply placed bonded interface layer formed between said core and said tube by a radially driven interdiffusion of said first and second materials, wherein said first and second glass materials have respective first and second predetermined material properties and wherein said deeply placed bonded interface layer has a material property that is a product of said radially driven interdiffusion of said first and second materials, wherein said tube has a thickness perpendicular to said central axis of greater than about one millimeter, and wherein said material property of said deeply placed bonded interface layer varies along a smooth gradient between said core and said tube.

2. A glass preform formed by a process comprising the steps of:
   a) providing a glass tube on a glass core to form an initial preform structure;
   b) supporting said initial preform structure to substantially maintain the shape and finite size of said initial preform structure; and
   c) heating said initial preform structure to form a deeply placed radial bonded layer having a uniform radial gradient at the interface between said tube and said core, whereby said initial preform structure becomes said glass preform, wherein said step of supporting provides for substantially maintaining the finite dimensions of said initial preform structure through said step of heating.

3. The glass preform of claim 2 wherein said process further comprises the step of rotating said initial preform structure on an axis parallel to a predetermined axis of said initial preform structure during said step of heating.

4. The glass preform of claim 3 wherein, prior to said step of heating, said process further comprises the steps of:
   a) coating the external surface of said initial preform structure with a non-stick agent; and
   b) placing said initial preform structure in a heat resistant case structurally conforming to the external surface of said initial preform structure.

5. A glass preform comprising:
   a) a uniform central cylindrical core of a first optical material;
   b) a uniform covering cylindrical layer concentrically surrounding said central cylindrical core, said covering cylindrical layer being of a second optical material; and
   c) a deeply placed bonded interface layer concentrically interposed between said central cylindrical core and said covering cylindrical layer, wherein said deeply placed bonded interface layer is of an optical material consisting of said first optical material and said second optical material in proportion, along a radial gradient, to the mutual inter-diffusion characteristics of said first and second optical materials, wherein the radial midpoint of said deeply placed bonded interface layer, relative to the cylindrical axis of said optical preform, is at a depth of greater than about one millimeter from the radially distal surface of said covering cylindrical layer.

6. The optical preform of claim 5 wherein said deeply placed bonded interface layer extends radially across substantially the entire radius of said fiber preform.

7. A preform of finite length having a glass structure with a fixed uniform cylindrical surface contour and a predetermined material characteristic that varies according to a predetermined radial profile consistently for all radiuses of said glass structure, said preform being formed by a process comprising the steps of:
   a) providing one or more glass layers of a softened glass material over a primary surface of a substantially unsoftened glass core material to form an integral glass structure, each said glass layer having a respective reproducibly uniform thickness and substantially reproducing the surface contour of said primary surface;
   b) heating said glass layers and glass core material to cause mutual interdiffusion thereinbetween; and
   c) rotating said integral glass structure about an axis substantially parallel to said primary surface during said step of heating to effect reproducible uniform mutual interdiffusion between said glass layers and said glass core material.

8. The preform of claim 7 wherein said predetermined material characteristic is the index of refraction.

9. The preform of claim 7 wherein said predetermined radial profile is defined by the mutual interdiffusion of one or more glass layers, each having a predetermined radial thickness that is uniform and consistently reproducible, circumferentially overlying a central glass core.

10. The preform of claim 9 wherein said predetermined material characteristic is the index of refraction and wherein said glass core comprises a first initial glass material having a first predetermined index of refraction and wherein a predetermined one of said glass layers is comprised of a second initial glass material having a second predetermined index of refraction.

11. The preform of claim 7 wherein the process of forming said preform further comprises the step of supporting said integral glass structure so as to maintain the reproduction of the surface contour of said primary surface through said step of heating and wherein said step of heating provides for the heating of said integral glass structure to a temperature greater than about the softening temperature of said glass core material.

12. The preform of claim 11 wherein, in the process of forming said preform, said step of heating provides for the mutual interdiffusion between said glass layers and said glass core material to extend substantially through the thickness of a predetermined one of said glass layers.

13. The preform of claim 12 wherein there are two or more glass layers.

* * * * *